US012764663B2

(12) United States Patent
Pan et al.

(10) Patent No.: US 12,764,663 B2
(45) Date of Patent: Oct. 13, 2026

(54) STATE SWITCHING METHOD AND APPARATUS AND BEACON SIGNAL SENDING METHOD AND APPARATUS

(71) Applicant: VIVO MOBILE COMMUNICATION CO., LTD., Guangdong (CN)

(72) Inventors: Xueming Pan, Guangdong (CN); Xiaodong Shen, Guangdong (CN); Li Chen, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 324 days.

(21) Appl. No.: 18/452,658

(22) Filed: Aug. 21, 2023

(65) Prior Publication Data

US 2023/0397117 A1 Dec. 7, 2023

Related U.S. Application Data

(63) Continuation of application No. PCT/CN2022/076568, filed on Feb. 17, 2022.

(30) Foreign Application Priority Data

Feb. 22, 2021 (CN) ......................... 202110206796.6

(51) Int. Cl.
*H04W 52/02* (2009.01)
*H04W 76/20* (2018.01)

(52) U.S. Cl.
CPC ....... *H04W 52/0235* (2013.01); *H04W 76/20* (2018.02)

(58) Field of Classification Search
None
See application file for complete search history.

(56) References Cited

U.S. PATENT DOCUMENTS

| | | | | |
|---|---|---|---|---|
| 5,734,984 | A | 3/1998 | Reece et al. | |
| 7,417,971 | B2 * | 8/2008 | Jeong .................... | H04W 68/00 455/450 |
| 2003/0145092 | A1 | 7/2003 | Funato et al. | |
| 2007/0053315 | A1 | 3/2007 | Sugaya | |
| 2007/0115873 | A1 | 5/2007 | Kim et al. | |

(Continued)

FOREIGN PATENT DOCUMENTS

| | | | |
|---|---|---|---|
| CN | 102124790 | A | 7/2011 |
| CN | 109417688 | A | 3/2019 |

(Continued)

OTHER PUBLICATIONS

Third Japanese Office Action for Japanese Patent Application No. 2023-550698 dated Oct. 15, 2025, 7 pages.

*Primary Examiner* — Saumit Shah
(74) *Attorney, Agent, or Firm* — Price Heneveld LLP

(57) ABSTRACT

A state switching method and apparatus and a beacon signal sending method and apparatus are disclosed, and pertains to the field of communication technologies. The state switching method includes: in a case of monitoring for a wake-up signal in a low-power state, detecting, by a terminal, a beacon signal based on pre-configured configuration information; and switching, by the terminal, to an idle state in a case that a detection result is at least one of the following: the terminal has detected no beacon signal; and signal quality of the beacon signal detected by the terminal is lower than a preset threshold.

16 Claims, 5 Drawing Sheets

(56) References Cited

U.S. PATENT DOCUMENTS

| | | | | |
|---|---|---|---|---|
| 2010/0048212 | A1 | 2/2010 | Yavuz et al. | |
| 2010/0290387 | A1 | 11/2010 | Chou et al. | |
| 2013/0329576 | A1 | 12/2013 | Sinha | |
| 2015/0126188 | A1 | 5/2015 | Lindoff et al. | |
| 2015/0358907 | A1* | 12/2015 | Berggren | H04W 52/0235 455/574 |
| 2019/0253969 | A1 | 8/2019 | Park et al. | |
| 2019/0356434 | A1* | 11/2019 | Stauffer | H04W 72/54 |
| 2019/0373477 | A1 | 12/2019 | Gulick, Jr. et al. | |
| 2020/0178176 | A1* | 6/2020 | Kim | H04W 52/0216 |
| 2020/0187120 | A1 | 6/2020 | Alanen et al. | |
| 2021/0067912 | A1* | 3/2021 | Leem | H04W 4/023 |
| 2021/0195517 | A1 | 6/2021 | Yang et al. | |
| 2021/0266824 | A1 | 8/2021 | Ina | |

FOREIGN PATENT DOCUMENTS

| | | | |
|---|---|---|---|
| CN | 110521223 | A | 11/2019 |
| CN | 110557813 | A | 12/2019 |
| CN | 110691399 | A | 1/2020 |
| CN | 111727614 | A | 9/2020 |
| JP | 2006325175 | A | 11/2006 |
| JP | 2008543210 | A | 11/2008 |
| JP | 2009515416 | A | 4/2009 |
| JP | 2015516785 | A | 6/2015 |
| JP | 2020078005 | A | 5/2020 |
| WO | 2010030945 | A1 | 3/2010 |
| WO | 2018063340 | A1 | 4/2015 |
| WO | 2020095685 | A1 | 5/2020 |

* cited by examiner

STATE SWITCHING METHOD AND APPARATUS AND BEACON SIGNAL SENDING METHOD AND APPARATUS

CROSS-REFERENCE TO RELATED APPLICATIONS

This application is a continuation application of PCT International Application No. PCT/CN2022/076568 filed on Feb. 17, 2022, which claims priority to Chinese Patent Application No. 202110206796.6, filed in China on Feb. 22, 2021, both of which are incorporated herein by reference in their entirety.

TECHNICAL FIELD

This application pertains to the field of communication technologies and specifically relates to a state switching method and apparatus and a beacon signal sending method and apparatus.

BACKGROUND

Considering the requirement of power saving, a terminal uses a simplified circuit to receive a wake-up signal at low power, which leads to a reduction in detection sensitivity for the wake-up signal. For example, the detection sensitivity for the wake-up signal in an idle (IDLE) state is about −100 dBm, while the detection sensitivity for the wake-up signal at low power is −70 dBm to −90 dBm. However, during the wake-up signal detection by the terminal in the low-power state, the terminal may move out of the coverage of the low-power wake-up signal due to movement or environmental changes, resulting in failure in receiving the wake-up signal sent by a network side.

SUMMARY

According to a first aspect, a state switching method is provided and includes: in a case of monitoring for a wake-up signal in a low-power state, detecting, by a terminal, a beacon signal based on pre-configured configuration information; and switching, by the terminal, from a sleep state to an idle state in a case that a detection result is at least one of the following: the terminal has detected no beacon signal; and signal quality of the beacon signal detected by the terminal is lower than a preset threshold.

According to a second aspect, a beacon signal sending method is provided and includes: sending, by a network-side device, a beacon signal to a terminal; where the network-side device is a network-side device in a first cell among a plurality of cells, the terminal moves within a target paging area, and the target paging area includes radiation areas of the plurality of cells.

According to a third aspect, a state switching apparatus is provided. The apparatus is applied to a terminal and includes: a detection module configured to detect a beacon signal based on pre-configured configuration information in a case of monitoring for a wake-up signal in a low-power state; and a switching module configured to switch to an idle state in a case that a detection result is at least one of the following: no beacon signal has been detected; and signal quality of the detected beacon signal is lower than a preset threshold.

According to a fourth aspect, a beacon signal sending apparatus is provided. The apparatus is applied to a network-side device and includes: a first sending module configured to send a beacon signal to a terminal; where the network-side device is a network-side device in a first cell among a plurality of cells, the terminal moves within a target paging area, and the target paging area includes radiation areas of the plurality of cells.

According to a fifth aspect, a terminal is provided, where the terminal includes a processor, a memory, and a program or instructions stored in the memory and capable of running on the processor, and when the program or instructions are executed by the processor, the steps of the method according to the first aspect are implemented.

According to a sixth aspect, a network-side device is provided, where the network-side device includes a processor, a memory, and a program or instructions stored in the memory and capable of running on the processor, where when the program or instructions are executed by the processor, the steps of the method according to the second aspect are implemented.

According to a seventh aspect, a readable storage medium is provided, where the readable storage medium stores a program or instructions, and when the program or instructions are executed by a processor, the steps of the method according to the first aspect are implemented, or the steps of the method according to the second aspect are implemented.

According to an eighth aspect, a chip is provided. The chip includes a processor and a communication interface, where the communication interface is coupled to the processor, and the processor is configured to run a program or instructions on a network-side device to implement the steps of the method according to the first aspect or the steps of the method according to the second aspect.

According to a ninth aspect, a computer program product is provided, where the computer program product is stored in a storage medium, and the computer program product is executed by at least one processor to implement the steps of the method according to the first aspect or the steps of the method according to the second aspect.

DESCRIPTION OF EMBODIMENTS

The following clearly describes the technical solutions in the embodiments of this application with reference to the accompanying drawings in the embodiments of this application. Apparently, the described embodiments are only some but not all of the embodiments of this application. All other embodiments obtained by persons of ordinary skill in the art based on the embodiments of this application shall fall within the protection scope of this application.

The terms "first", "second", and the like in the specification and claims of this application are used to distinguish between similar objects rather than to describe a specific order or sequence. It should be understood that data used in this way is interchangeable in appropriate circumstances such that the embodiments of this application can be implemented in other orders than the order illustrated or described herein. In addition, objects distinguished by "first" and "second" are generally of a same type, and the quantities of the objects are not limited, for example, there may be one or more first objects. In addition, in the specification and claims, "and/or" indicates at least one of the connected objects, and the character "/" generally indicates an "or" relationship between the contextually associated objects.

It should be noted that the technologies described in the embodiments of this application are not limited to long term evolution (LTE)/LTE-advanced (LTE-A) systems, but may also be used in other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are often used interchangeably, and the technology described herein may be used in the above-mentioned systems and radio technologies as well as other systems and radio technologies. In the following descriptions, a new radio (NR) system is described for illustration purposes, and NR terms are used in most of the following descriptions, although these technologies may also be applied to other applications than the NR system application, for example, the 6th generation (6G) communication system.

Figure 1:
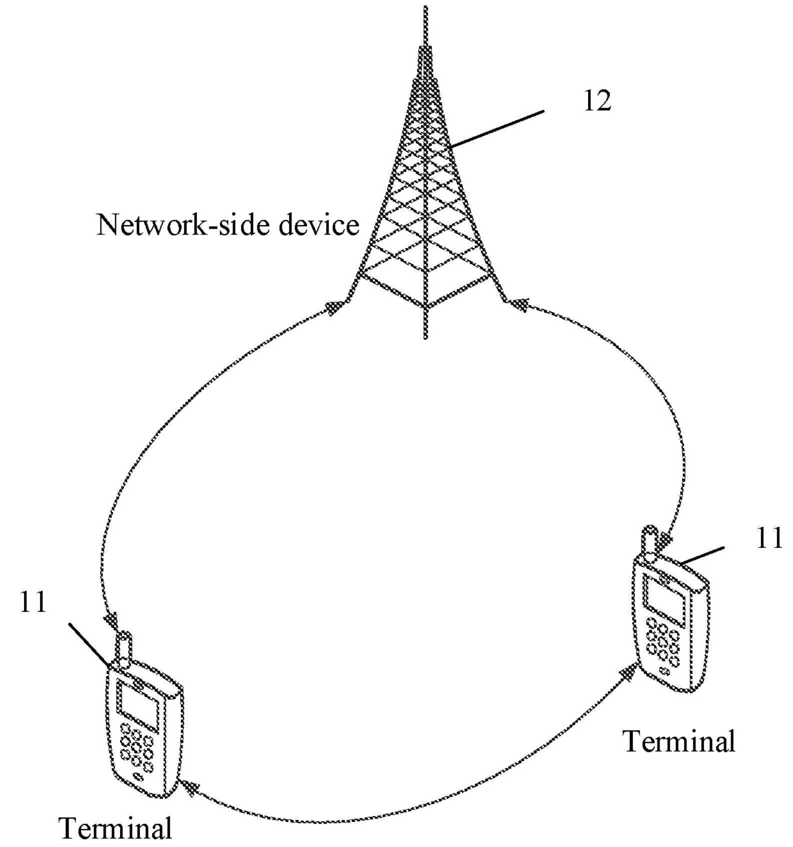
FIG. 1 is a block diagram of a wireless communication system to which the embodiments of this application are applicable.

FIG. 1 is a block diagram of a wireless communication system to which the embodiments of this application are applicable. The wireless communication system includes a terminal 11 and a network-side device 12. The terminal 11 may also be referred to as a terminal device or user equipment (UE). The terminal 11 may be a terminal-side device, such as a mobile phone, a tablet personal computer, a laptop computer or notebook computer, a personal digital assistant (PDA), a palmtop computer, a netbook, an ultra-mobile personal computer (UMPC), a mobile internet device (MID), a wearable device, vehicular user equipment (VUE), or pedestrian user equipment (PUE). The wearable device includes a wrist band, earphones, glasses, or the like. It should be noted that the terminal 11 is not limited to any particular type in the embodiments of this application. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a home NodeB, a home evolved NodeB, a wireless local area network (WLAN) access point, a wireless fidelity (Wi-Fi) node, a transmitting receiving point (TRP), or other appropriate terms in the art. Provided that the same technical effects are achieved, the base station is not limited to any specific technical term. It should be noted that in the embodiments of this application, only the base station in the NR system is used as an example, although the specific type of the base station is not limited.

Related terms involved in this application are first described accordingly.

In the communication system designs of the third-generation mobile communication technology (Third-Generation, 3G), the fourth-generation mobile communication technology (Fourth-Generation, 4G), and the fifth-generation mobile communication technology (Fifth-Generation, 5G), different states of a terminal (User Equipment, UE), such as an idle (IDLE) state and a connected (CONNECTED) state, are introduced. After receiving and sending data, to save power, the UE can switch from the CONNECTED state to the IDLE state. In the IDLE state, the UE only needs to receive necessary synchronization information, paging information, system information broadcast (SIB), and the like. As compared with the CONNECTED state, the power can be reduced more, generally to the level of teens of mW, which is one-tenth or even smaller than that in the CONNECTED state.

However, the foregoing design of the IDLE state still requires the terminal to periodically turn on a transceiver and a corresponding MODEM signal processing module to process a received signal accordingly. Because these RF and MODEM modules cannot be truly completely turned off, the communication power in the IDLE state cannot be reduced. This is mainly due to the need to receive synchronization information, paging information, and system information broadcast (SIB).

Therefore, with a SLEEP (sleep) state introduced, the terminal can further reduce the reception of synchronization information, paging information, SIB, or the like in the SLEEP state. With the reduction of the reception activities, the radio frequency (RF) and modem (MODEM) modules can be truly turned off, thereby greatly reducing the power of communication reception. Technically, this can be achieved by introducing a low-power receiver in the receiving module of the terminal. This low-power receiver does not require signal detection (such as amplification, filtering, and quantization) by the RF module or signal processing by the MODEM, and relies only on passive matched filtering and low-power processing of a wake-up signal. For example, after receiving a wake-up signal, the terminal turns on a main receiver to monitor for signals such as paging and system information in the IDLE state.

The following further describes a radio resource control (RRC) state and a wake-up signal.

I. RRC State

A mobile phone and a network communicate with each other through wireless channels and exchange a large amount of information. Therefore, both sides need a control mechanism to exchange configuration information and reach an agreement, and this control mechanism is RRC. To keep the terminal in a relatively fixed communication state, different RRC states are introduced in the 4G and 5G communication systems. For 5G NR, there are three RRC states: IDLE, INACTIVE, and CONNECTED. For 4G LTE, there are only two RRC states: RRC IDLE and RRC CONNECTED. Characteristics of the three states are as follows:

(1) RRC IDLE (Idle Mode):
- public land mobile network (PLMN) selection;
- broadcast of system information;
- cell re-selection mobility;
- paging for mobile terminated data is initiated by 5G core network (5GC);
- paging for mobile terminated data area is managed by 5GC; and
- discontinuous reception (DRX) for core network (CN) paging configured by non-standalone (NAS).

(2) RRC INACTIVE (Deactivation Mode):

PLMN selection;
broadcast of system information;
cell re-selection mobility;
paging is initiated by 5G radio access network (Next Generation Radio Access Network, NG-RAN) (RAN paging);
RAN-based notification area (RNA) is managed by NG-RAN;
DRX for RAN paging configured by NG-RAN;
5GC-NG-RAN connection (both C/U-planes) is established for UE;
the UE AS context is stored in NG-RAN and the UE; and
NG-RAN knows the RNA which the UE belongs to.

(3) RRC CONNECTED (Connected Mode):
5GC-NG-RAN connection (both C/U-planes) is established for UE;
the UE AS context is stored in NG-RAN and the UE;
NG-RAN knows the cell which the UE belongs to;
transfer of unicast data to/from the UE; and
network controlled mobility including measurements.

II. Wake-Up Signal (WUS)

To reduce the reception activities in the RRC IDLE state so that the RF and MODEM modules are truly turned off to greatly reduce the power of communication reception, a low-power receiver can be introduced in the receiving module of the terminal. This low-power receiver does not require signal detection (such as amplification, filtering, and quantization) by the RF module or signal processing by the MODEM, and relies only on passive matched filtering and low-power signal processing.

On the base station side, triggering an on-demand wake-up signal can activate the low-power receiver to know the activation notification, thereby triggering a series of processes inside the terminal, for example, turning on modules such as radio frequency transceiver and baseband processing. In addition, the wake-up signal may be an on-off keying signal (on-off keying), that is, the receiver can know the wake-up notification through processes such as simple energy detection and subsequent possible sequence detection and identification.

It should be noted that the low power involved in this application is compared with the power level required for traditional MODEM baseband signal processing. The power consumed by the low-power receiver is only one out of several tens or even a thousandth of that of the traditional MODEM baseband signal processing. Therefore, in this application, the wake-up signal received at low power may also be referred to as a low-power wake-up signal.

The following describes in detail the state switching method provided in the embodiments of this application through specific embodiments and application scenarios thereof with reference to the accompanying drawings.

Figure 2:
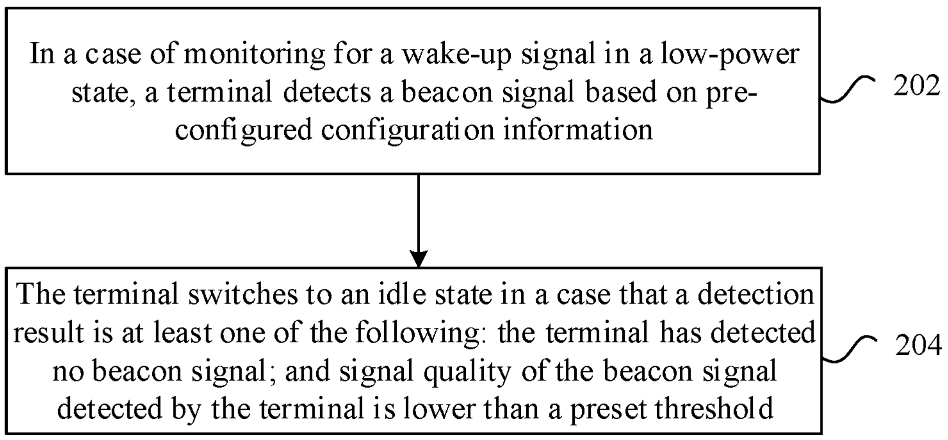
FIG. 2 is a schematic flowchart of a state switching method according to an embodiment of this application.

As shown in FIG. 2, an embodiment of this application provides a state switching method, and the method includes the following steps.

Step 202. In a case of monitoring for a wake-up signal in a low-power state, a terminal detects a beacon signal based on pre-configured configuration information.

Step 204. The terminal switches to an idle state in a case that a detection result is at least one of the following:
the terminal has detected no beacon signal; and
signal quality of the beacon signal detected by the terminal is lower than a preset threshold.

Through step 202 and step 204 in this embodiment of this application, in a case of monitoring for the wake-up signal in the low-power state, whether to switch to the idle state is determined based on the detection result of the beacon signal. In other words, in a case that the terminal has detected no beacon (Beacon) signal or that the signal quality of the beacon signal detected by the terminal is lower than the preset threshold, it indicates that the terminal moves out of the coverage of the wake-up signal and cannot receive the wake-up signal, which means a loss of service between the terminal and the network side. After the terminal switches to the idle state, the terminal is activated to turn on modules such as radio frequency transceiver and baseband processing to realize a connection with the network side, thereby solving the prior-art problem that in a low-power state, a terminal cannot receive a wake-up signal sent by a network side in a case that the terminal moves out of a coverage of the low-power wake-up signal, resulting in a loss of service between the terminal and the network side.

It should be noted that the pre-configured configuration information in this application may be sent to the terminal by the network-side device, or predefined by a protocol, or pre-configured in the terminal, which is not limited to any specific manner in this application and can be configured accordingly based on actual needs.

In addition, in general cases, the wake-up signal involved in this embodiment of this application may be sent only when the network needs to wake up the terminal (for example, the terminal needs to be woken up to monitor for paging information), and the beacon signal is sent periodically based on resources configured by the network. The resources configured by the network include resources sent to the terminal by the network-side device, predefined by a protocol, or the like. A specific configuration manner can be adjusted accordingly based on actual needs.

In an optional implementation of this embodiment of this application, before the detecting, by a terminal, a beacon signal based on pre-configured configuration information, the method in this embodiment of this application may further include the following step.

Step 200. In the idle state or a connected state, the terminal obtains the configuration information. The configuration information in this embodiment of this application may include at least one of the following: frequency of the beacon signal, subcarrier of the beacon signal, slot of the beacon signal, sequence of the beacon signal, period of the beacon signal, and power of the beacon signal.

In addition, the signal quality of the beacon signal in this embodiment of this application may include at least one of the following: signal reception strength and pathloss measurement value. Certainly, the signal quality of the beacon signal is only an example, and other parameters that can represent the signal quality are also within the protection scope of this application. A specific signal quality can be set accordingly based on actual situations.

Optionally, the low-power state in this embodiment of this application includes a sleep state. As compared with the idle state, in the sleep state, signal detection (such as amplification, filtering, and quantization) by the RF module and signal processing by the MODEM are not required, and only passive matched filtering and low-power processing of a wake-up signal are relied on. After receiving the wake-up signal, the terminal turns on a main receiver to monitor for paging, system information, and the like in the IDLE state.

Based on this, the manner of switching to the idle state involved in step 204 may further include at least one of the following in a specific application scenario.

Step 204-11. In a case of detecting no beacon signal sent by the network-side device at a preset resource position, the terminal exits the SLEEP (sleep) state and returns to the normal IDLE state monitoring mode.

Step 204-12. In a case of detecting, at a preset resource position, that quality of a beacon signal sent by the network-side device is lower than the preset threshold, the terminal exits the SLEEP state and returns to the normal IDLE state monitoring mode.

Through the detection of the beacon signal in step 204-11 and step 204-12, the terminal can track the quality of the signal sent by the network side in real time, and based on the tracking result, avoid the problem of being unable to receive the wake-up signal due to moving out of the coverage of the wake-up signal.

In an optional implementation of this embodiment of this application, after the switching, by the terminal, from the current state to an idle state, the terminal performs at least one of the following operations:

(1) cell search;

(2) downlink synchronization;

(3) cell selection;

(4) receiving system information in a camped cell selected;

(5) receiving paging information in a camped cell selected; and (6) initiating a random access procedure in a camped cell selected.

It can be learned that in the idle state, the terminal can normally perform corresponding operations compared with the low-power state. In other words, in the low-power state, the terminal does not require signal detection (such as amplification, filtering, and quantization) by the RF module or signal processing by the MODEM, and relies only on passive matched filtering and low-power processing of a wake-up signal, achieving the effect of power saving. After receiving the wake-up signal, the terminal can turn on a main receiver to monitor for paging, system information, and the like in the IDLE state.

In an optional implementation of this embodiment of this application, the method in this embodiment of this application may further include the following step.

Step 206. The terminal continues to stay in the low-power state to monitor for the wake-up signal in a case that the detection result satisfies the following condition: the terminal has detected a beacon signal with signal quality greater than or equal to the preset threshold.

It should be noted that the preset threshold in this embodiment of this application can be set accordingly based on specific situations, and is not limited to any specific value in this embodiment of this application.

In this embodiment of this application, the terminal may enter the low-power state from the idle state based on network configuration or according to pre-configured conditions. In a case that the low-power state includes the sleep state, the terminal monitors for the low-power wake-up signal in the sleep state, and does not perform any normal monitoring behavior in the idle state.

It should be noted that the manner of a terminal detecting a beacon signal based on pre-configured configuration information involved in step 202 in this embodiment of this application may further include: during movement within a target paging area, detecting, by the terminal based on the configuration information, the beacon signals respectively sent by a plurality of cells.

Figure 3:
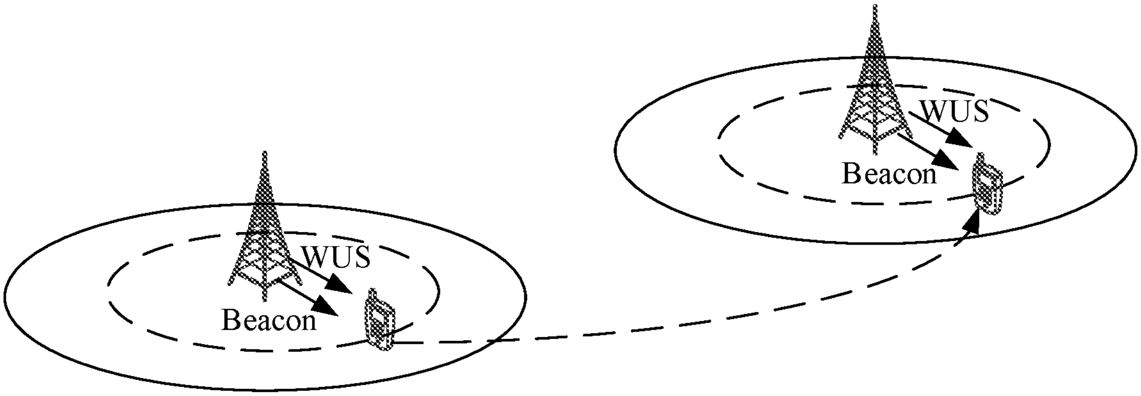
FIG. 3 is a schematic diagram of a terminal moving within a paging area according to an embodiment of this application.

The beacon signals sent by the plurality of cells may be all the same, partially the same, or different from each other. As shown in FIG. 3, in a multi-cell environment, a network side may send the same beacon signal in a plurality of cells or a plurality of different cell groups. For example, the network side sends the same beacon signal within a paging area (target paging area). In a SLEEP state, when the terminal moves within the paging area, it only needs to monitor for one normal beacon signal, that is, it only needs to monitor for one beacon signal with signal quality greater than or equal to the preset threshold, to continue to stay in the SLEEP state (that is, a low-power state) to receive a wake-up signal (WUS). Adjacent cells in the paging area send the same beacon signal.

For another example, in a multi-cell environment, a network side may send different beacon signals in different cells or different cell groups. For example, the network side sends different beacon signals in different cells or different cell groups within a paging area. As shown in FIG. 3, adjacent cells in the paging area send different beacon signals. Considering that the terminal may move across cells in the SLEEP state, the terminal can obtain configuration information of the plurality of beacon signals corresponding to different cells or different cell groups from the network, and keep monitoring for the plurality of beacon signals. In this case, as long as normally detecting any beacon signal (detecting any beacon signal with signal quality greater than or equal to the preset threshold), the terminal can continue to stay in the SLEEP state (that is, the low-power state) to receive the wake-up signal (WUS). Otherwise, the terminal returns to the IDLE state and performs subsequent operations to avoid disconnection between the terminal and the network side. The operation performed when the terminal returns to the IDLE state may be at least one of the following: (1) cell search; (2) downlink synchronization; (3) cell selection; (4) receiving system information in a camped cell selected; (5) receiving paging information in a camped cell selected; and (6) initiating a random access procedure in a camped cell selected.

The foregoing describes this application from the terminal side. For the network side, this application further provides a beacon signal sending method, and the method includes the following steps.

Step 302. A network-side device sends a beacon signal to a terminal; where the network-side device sends the beacon signal in one or more cells within a target paging area.

The beacon signal sent by the network-side device in the plurality of cells within the target paging area is at least one of the following: a same beacon signal across all cells; a same beacon signal across some of the cells; a distinct beacon signal in each cell.

Step 304. The network-side device sends configuration information of the beacon signal to the terminal.

The configuration information in this embodiment of this application includes at least one of the following: frequency of the beacon signal, subcarrier of the beacon signal, slot of the beacon signal, sequence of the beacon signal, period of the beacon signal, and power of the beacon signal.

In other words, in this application, the network-side device can send a beacon signal, and the terminal can detect the beacon signal in the low-power state to determine whether to exit the low-power state to return to the idle state. This realizes stable reception of the wake-up signal.

It should be noted that the state switching method and the beacon signal sending method provided in the embodiments of this application may be performed by a state switching apparatus and a beacon signal sending apparatus, respectively, or by a control module for performing the state switching method in the state switching apparatus and a control module for performing the beacon signal sending method in the beacon signal sending apparatus, respectively. In the embodiments of this application, the state switching method and the beacon signal sending method being performed by the state switching apparatus and the beacon signal sending apparatus respectively is used as an example to describe the state switching apparatus and beacon signal sending apparatus provided in the embodiments of this application.

Figure 4:
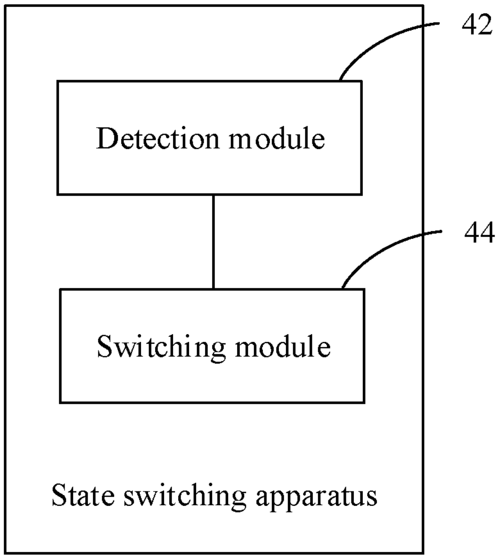
FIG. 4 is a schematic structural diagram of a state switching apparatus according to an embodiment of this application.

An embodiment of this application further provides a state switching apparatus. The apparatus is applied to a terminal. As shown in FIG. 4, the apparatus includes:

a detection module 42 configured to detect a beacon signal based on pre-configured configuration information in a case of monitoring for a wake-up signal in a low-power state; and a switching module 44 configured to switch to an idle state in a case that a detection result is at least one of the following:

no beacon signal has been detected; and signal quality of the detected beacon signal is lower than a preset threshold.

In this application, in a case of monitoring for the wake-up signal in the low-power state, whether to switch to the idle state is determined based on the detection result of the beacon signal. In other words, in a case that the terminal has detected no beacon (Beacon) signal or that the signal quality of the beacon signal detected by the terminal is lower than the preset threshold, it indicates that the terminal moves out of the coverage of the wake-up signal and cannot receive the wake-up signal. In this case, the terminal needs to switch to the idle (Idle) state, and in this idle state, the terminal can receive the wake-up signal with higher sensitivity, ensuring continuous and stable reception of the wake-up signal, thereby solving the prior-art problem that in a low-power state, a terminal cannot receive a wake-up signal sent by a network side in a case that the terminal moves out of a coverage of the low-power wake-up signal.

Optionally, the apparatus in this embodiment of this application may further include an obtaining module configured to obtain the configuration information in the idle state or a connected state before the beacon signal is detected based on the pre-configured configuration information.

The configuration information includes at least one of the following: frequency of the beacon signal, subcarrier of the beacon signal, slot of the beacon signal, sequence of the beacon signal, period of the beacon signal, and power of the beacon signal.

Optionally, the signal quality of the beacon signal in this embodiment of this application includes at least one of the following: signal reception strength and pathloss measurement value.

Optionally, the apparatus in this embodiment of this application may further include an execution module configured to perform at least one of the following operations after the switching to the idle state: cell search; downlink synchronization; cell selection; receiving system information in a camped cell selected; receiving paging information in a camped cell selected; and initiating a random access procedure in a camped cell selected.

Optionally, the apparatus in this embodiment of this application may further include a stay module configured to continue to stay in the low-power state to monitor for the wake-up signal in a case that the detection result satisfies the following condition: a beacon signal with signal quality greater than or equal to the preset threshold has been detected.

Optionally, the detection module in this embodiment of this application may further include a detection unit configured to detect, based on the configuration information during movement within a target paging area, the beacon signals respectively sent by a plurality of cells.

Optionally, the low-power state in this embodiment of this application includes a sleep state.

The state switching apparatus in this embodiment of this application corresponds to the state switching method in FIG. 2. In addition, an embodiment of this application further provides a beacon signal sending apparatus. The apparatus is applied to a network-side device and includes:

a first sending module configured to send a beacon signal to a terminal; where the network-side device sends the beacon signal in one or more cells within a target paging area.

The beacon signal sent in the plurality of cells within the target paging area is at least one of the following: a same beacon signal across all cells; a same beacon signal across some of the cells; and a distinct beacon signal in each cell.

Optionally, the beacon signal sending apparatus in this embodiment of this application may further include a second sending module configured to send configuration information of the beacon signal to the terminal. The configuration information in this embodiment of this application includes at least one of the following: frequency of the beacon signal, subcarrier of the beacon signal, slot of the beacon signal, sequence of the beacon signal, period of the beacon signal, and power of the beacon signal.

It should be noted that the beacon signal sending apparatus corresponds to the beacon signal sending method.

The state switching apparatus and beacon signal sending apparatus in the embodiments of this application may be an apparatus or a component, integrated circuit, or chip in a terminal. The apparatus may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not specifically limited in this embodiment of this application.

The state switching apparatus and beacon signal sending apparatus in the embodiments of this application may be an apparatus with an operating system. The operating system may be an Android operating system, an iOS operating system, or another possible operating system. This is not specifically limited in the embodiments of this application.

The state switching apparatus provided in this embodiment of this application can implement the processes implemented in the method embodiment in FIG. 2, with the same technical effects achieved. To avoid repetition, details are not described herein again.

Figure 5:
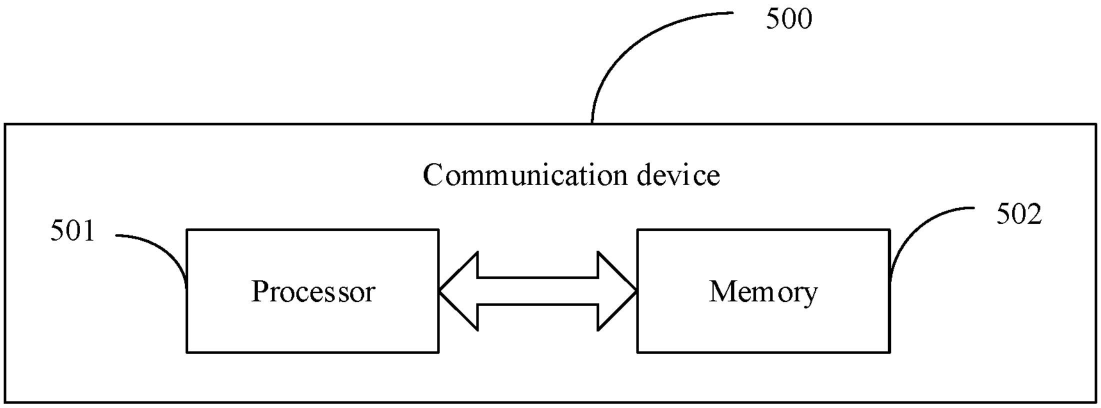
FIG. 5 is a schematic structural diagram of a communication device according to an embodiment of this application.

Optionally, as shown in FIG. 5, an embodiment of this application further provides a communication device 500, including a processor 501, a memory 502, and a program or instructions stored in the memory 502 and capable of running on the processor 501. For example, in a case that the communication device 500 is a terminal, when the program or instructions are executed by the processor 501, the processes of the foregoing embodiments of the state switching method or beacon signal sending method are implemented, with the same technical effects achieved. In a case that the communication device 500 is a network-side device, when the program or instructions are executed by the processor 501, the processes of the foregoing embodiments of the state switching method or beacon signal sending method are implemented, with the same technical effects achieved. To avoid repetition, details are not described herein again.

Figure 6:
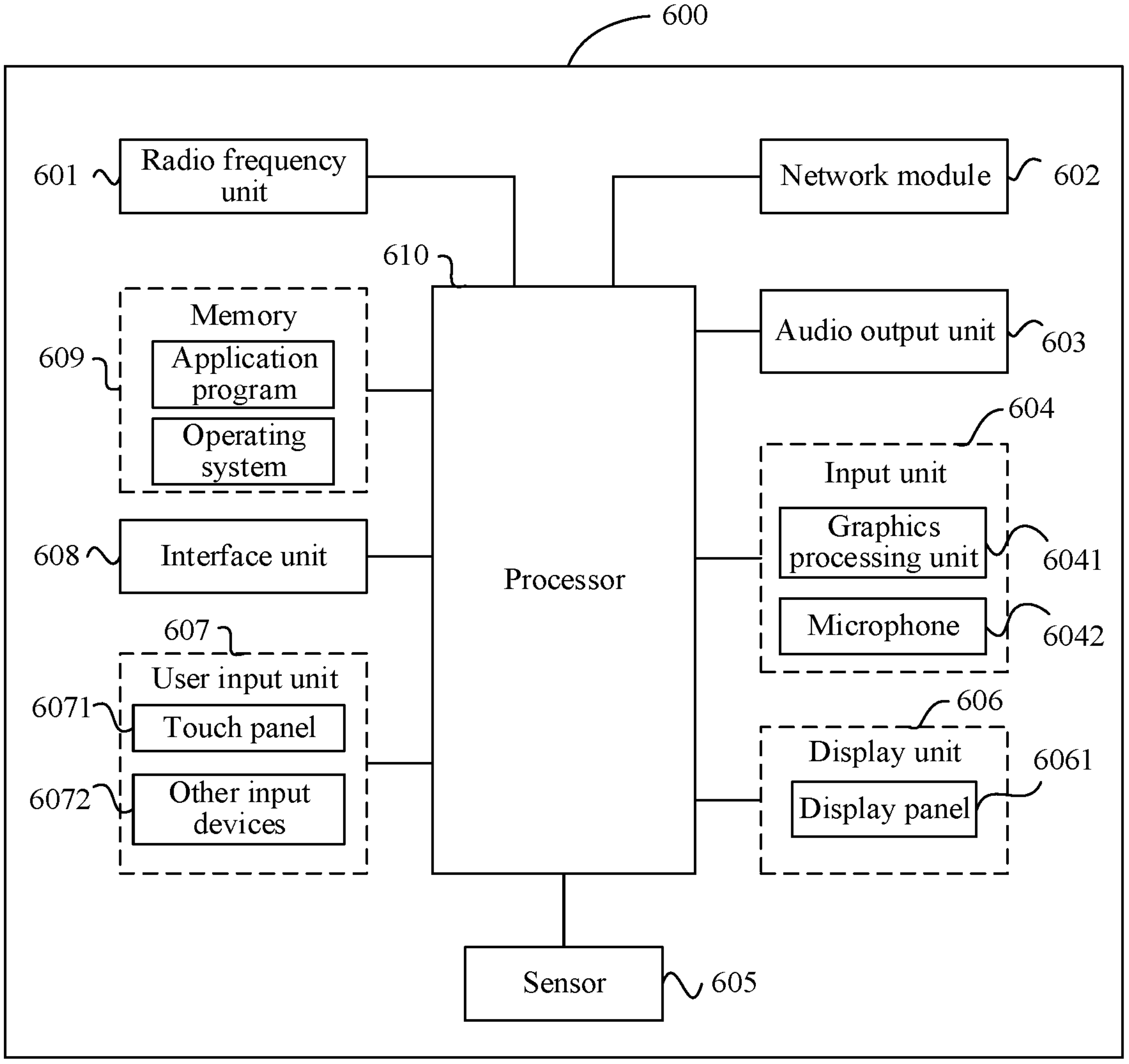
FIG. 6 is a schematic structural diagram of a terminal according to an embodiment of this application.

FIG. 6 is a schematic diagram of a hardware structure of a terminal for implementing the embodiments of this application.

The terminal 600 includes but is not limited to components such as a radio frequency unit 601, a network module 602, an audio output unit 603, an input unit 604, a sensor 605, a display unit 606, a user input unit 607, an interface unit 608, a memory 609, and a processor 610.

Persons skilled in the art can understand that the terminal 600 may further include a power supply (for example, a battery) for supplying power to the components. The power supply may be logically connected to the processor 610 via a power management system, so that functions such as charge management, discharge management, and power management are implemented via the power management system. The terminal structure shown in FIG. 6 does not constitute any limitation on the terminal. The terminal may include more or fewer components than shown in the figure, or combine some of the components, or arrange the components differently. Details are not described herein.

It should be understood that in this embodiment of this application, the input unit 604 may include a graphics processing unit (GPU) 6041 and a microphone 6042. The graphics processing unit 6041 processes image data of a static picture or a video that is obtained by an image capture apparatus (for example, a camera) in an image capture mode or a video capture mode. The display unit 606 may include a display panel 6061, and the display panel 6061 may be configured in a form of a liquid crystal display, an organic light-emitting diode display, or the like. The user input unit 607 includes a touch panel 6071 and other input devices 6072. The touch panel 6071 is also referred to as a touchscreen. The touch panel 6071 may include two parts: a touch detection apparatus and a touch controller. The other input devices 6072 may include but are not limited to a physical keyboard, a function button (for example, a volume control button or a power on/off button), a trackball, a mouse, and a joystick. Details are not described herein.

In this embodiment of this application, the radio frequency unit 601 sends downlink data received from a network-side device to the processor 610 for processing, and in addition, sends uplink data to the network-side device. Generally, the radio frequency unit 601 includes but is not limited to an antenna, at least one amplifier, a transceiver, a coupler, a low noise amplifier, and a duplexer.

The memory 609 may be configured to store a software program or instructions and various data. The memory 609 may mainly include a program or instruction storage area and a data storage area. The program or instruction storage area may store an operating system, an application program or instructions required by at least one function (for example, a sound play function or an image play function), and the like. In addition, the memory 609 may include a high-speed random access memory, and may further include a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory, for example, at least one disk storage device, a flash memory device, or another non-volatile solid-state storage device.

The processor 610 may include one or more processing units. Optionally, the processor 610 may integrate an application processor and a modem processor. The application processor mainly processes an operating system, a user interface, an application program or instructions, and the like. The modem processor mainly processes wireless communication, for example, a baseband processor. It can be understood that the modem processor may alternatively be not integrated into the processor 610.

The processor 610 is configured to detect a beacon signal based on pre-configured configuration information in a case of monitoring for a wake-up signal in a low-power state.

The processor 610 is further configured for the terminal to switch from a sleep state to an idle state in a case that a detection result is at least one of the following:

the terminal has detected no beacon signal; and signal quality of the beacon signal detected by the terminal is lower than a preset threshold.

It can be learned that in a case of monitoring for the wake-up signal in the low-power state, whether to switch to the idle state is determined based on the detection result of the beacon signal. In other words, in a case that the terminal has detected no beacon (Beacon) signal or that the signal quality of the beacon signal detected by the terminal is lower than the preset threshold, it indicates that the terminal moves out of the coverage of the wake-up signal and cannot receive the wake-up signal, which means a loss of service between the terminal and the network side. After the terminal switches to the idle (Idle) state, the terminal is activated to turn on modules such as radio frequency transceiver and baseband processing to realize a connection with the network side, thereby solving the prior-art problem that in a low-power state, a terminal cannot receive a wake-up signal sent by a network side in a case that the terminal moves out of a coverage of the low-power wake-up signal, resulting in a loss of service between the terminal and the network side.

Optionally, the processor 610 is further configured for the terminal to obtain the configuration information in the idle state or a connected state before the terminal detects the beacon signal based on the pre-configured configuration information.

Optionally, the processor 610 is further configured to perform at least one of the following operations after the terminal monitors for the low-power wake-up signal and switches from the sleep state to the idle state:

cell search;

downlink synchronization;

cell selection;

receiving system information in a camped cell selected;

receiving paging information in a camped cell selected; and initiating a random access procedure in a camped cell selected.

Optionally, the processor 610 is further configured for the terminal to continue to stay in the low-power sleep state to monitor for the power wake-up signal in a case that the detection result satisfies the following condition: the terminal has detected a beacon signal with signal quality greater than or equal to the preset threshold.

Optionally, the processor 610 is further configured for the terminal to detect, based on the configuration information during movement within a target paging area, the beacon signals respectively sent by a plurality of cells.

Figure 7:
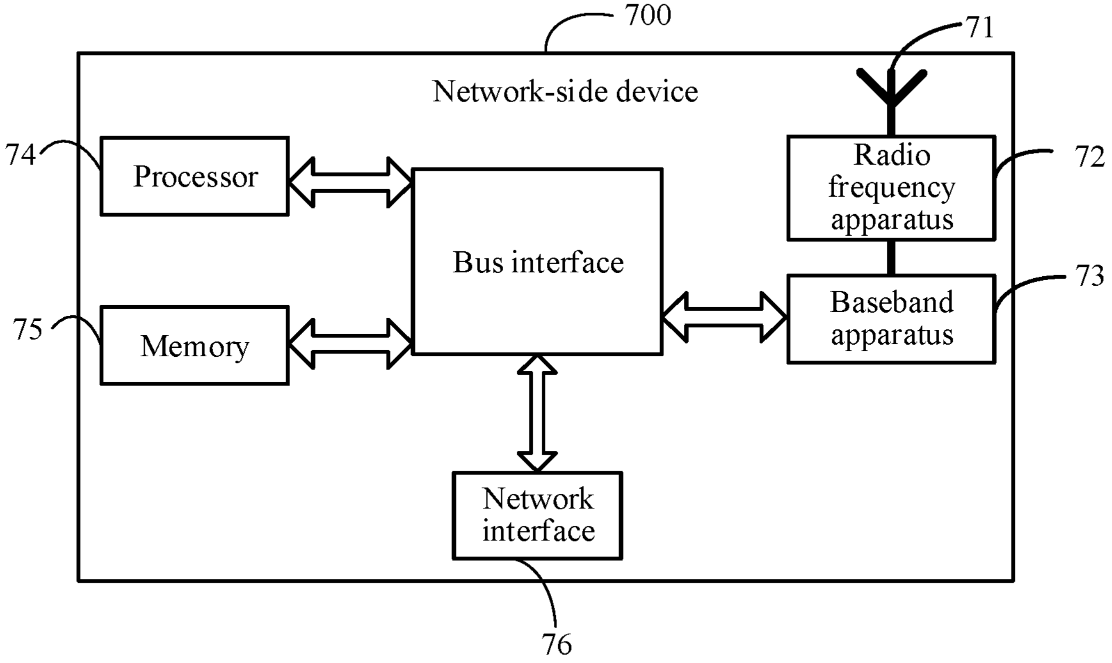
FIG. 7 is a schematic structural diagram of a network-side device according to an embodiment of this application.

Specifically, an embodiment of this application further provides a network-side device. As shown in FIG. 7, the network device 700 includes an antenna 71, a radio frequency apparatus 72, and a baseband apparatus 73. The antenna 71 is connected to the radio frequency apparatus 72. In an uplink direction, the radio frequency apparatus 72 receives information by using the antenna 71 and transmits the received information to the baseband apparatus 73 for processing. In a downlink direction, the baseband apparatus 73 processes to-be-transmitted information, and transmits the information to the radio frequency apparatus 72; and the radio frequency apparatus 72 processes the received information and then transmits the information by using the antenna 71.

The aforementioned baseband processor may be located in the baseband apparatus 73. The method performed by the network-side device in the foregoing embodiment may be implemented in the baseband apparatus 73, and the baseband apparatus 73 includes a processor 74 and a memory 75.

The baseband apparatus 73 may include, for example, at least one baseband processing unit, where a plurality of chips are disposed on the baseband processing unit. As shown in FIG. 7, one of the chips is, for example, the processor 74 which is connected to the memory 75 to invoke a program in the memory 75 to perform the operations of the network device shown in the foregoing method embodiment.

The baseband apparatus 73 may further include a network interface 76 configured to exchange information with the radio frequency apparatus 72, where the interface is, for example, a common public radio interface (CPRI).

Specifically, the network-side device in this embodiment of the present application further includes instructions or a program stored in the memory 75 and capable of running on the processor 74. The processor 74 invokes the instructions or program in the memory 75 to perform the method performed by the modules shown in FIG. 7, with the same technical effects achieved. To avoid repetition, details are not described herein again.

An embodiment of this application further provides a readable storage medium, where the readable storage medium may be non-transitory. The readable storage medium stores a program or instructions, and when the program or instructions are executed by a processor, the processes of the foregoing embodiments of the state switching method and beacon signal sending method are implemented, with the same technical effects achieved. To avoid repetition, details are not described herein again.

The processor is a processor in the terminal described in the foregoing embodiment. The readable storage medium includes a computer-readable storage medium, for example, a computer read-only memory (ROM), a random access memory (RAM), a magnetic disk, or an optical disc.

An embodiment of this application further provides a chip. The chip includes a processor and a communication interface. The communication interface is coupled to the processor, and the processor is configured to run a program or instructions on a network-side device to implement the processes of the foregoing embodiments of the state switching method and beacon signal sending method, with the same technical effects achieved. To avoid repetition, details are not described herein again.

It should be understood that the chip mentioned in this embodiment of this application may also be referred to as a system-level chip, a system chip, a chip system, a system-on-chip, or the like.

An embodiment of this application further provides a computer program product, where the computer program product is stored in a storage medium, and the computer program product is executed by at least one processor to implement the processes of the foregoing embodiments of the state switching method and beacon signal sending method, with the same technical effects achieved. To avoid repetition, details are not described herein again.

It should be noted that in the specification, the terms "include", "comprise", or any of their variants are intended to cover a non-exclusive inclusion, such that a process, method, article, or apparatus that includes a series of elements includes not only those elements but also other elements that are not expressly listed, or further includes elements inherent to such process, method, article, or apparatus. Without more restrictions, an element preceded by the statement "includes a . . . " does not preclude the presence of other identical elements in the process, method, article, or apparatus that includes the element. In addition, it should be noted that the scope of the method and apparatus in the implementations of this application is not limited to functions being performed in the order shown or discussed, but may further include functions being performed at substantially the same time or in a reverse order, depending on the functions involved. For example, the described method may be performed in an order different from the order described, and steps may be added, omitted, or combined. In addition, features described with reference to some examples may be combined in other examples.

From the foregoing description of the implementations, persons skilled in the art can clearly understand that the method in the foregoing embodiments may be implemented by software in combination with a necessary general hardware platform. Certainly, the method in the foregoing embodiments may alternatively be implemented by hardware. However, in many cases, the former is a preferred implementation. Based on such understanding, the technical solutions of this application essentially or the part thereof that contributes to the prior art may be implemented in a form of a software product. The computer software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing specific implementations. These specific implementations are merely illustrative rather than restrictive. Inspired by this application, persons of ordinary skill in the art may develop many other forms which do not depart from the essence of this application and the protection scope of the claims, and all such forms shall fall within the protection scope of this application.

What is claimed is:

1. A state switching method, comprising:

in a case of monitoring for a wake-up signal in a low-power state, detecting, by a terminal, a beacon signal based on pre-configured configuration information; and switching, by the terminal, to a normal idle state in a case that a detection result is at least one of the following:

the terminal has detected no beacon signal; or signal quality of the beacon signal detected by the terminal is lower than a preset threshold;

wherein before the detecting, by a terminal, a beacon signal based on pre-configured configuration information, the method further comprises:

in the normal idle state or a connected state, obtaining, by the terminal, the configuration information;

the configuration information comprises at least one of the following: frequency of the beacon signal, subcarrier of the beacon signal, slot of the beacon signal, sequence of the beacon signal, period of the beacon signal, or power of the beacon signal.

2. The method according to claim 1, wherein the normal idle state is radio resource control (RRC) idle state; and compared with the RRC idle state, a signal detection by a radio frequency (RF) module and a signal processing by a modem are not performed in the low-power state.

3. The method according to claim 1, further comprising:

in response to receiving the wake-up signal in the low-power state, waking up the terminal to enter the normal idle state to monitor at least one of synchronization information, paging information, or system information broadcast (SIB).

4. The method according to claim 1, wherein the signal quality of the beacon signal comprises at least one of the following: signal reception strength or pathloss measurement value.

5. The method according to claim 1, wherein after the switching, by the terminal, to the normal idle state, the terminal performs at least one of the following operations:

cell search;

downlink synchronization;

cell selection;

receiving system information in a camped cell selected;

receiving paging information in a camped cell selected; or initiating a random access procedure in a camped cell selected.

6. The method according to claim 1, wherein the method further comprises:

continuing, by the terminal, to stay in the low-power state to monitor for the wake-up signal in a case that the detection result satisfies the following condition:

the terminal has detected a beacon signal with signal quality greater than or equal to the preset threshold.

7. The method according to claim 1, wherein the detecting, by a terminal, a beacon signal based on pre-configured configuration information comprises:

during movement within a target paging area, detecting, by the terminal based on the configuration information, the beacon signals respectively sent by a plurality of cells.

8. The method according to claim 1, wherein the low-power state comprises a sleep state.

9. A non-transitory readable storage medium, wherein the storage medium stores instructions, the instructions, when executed by a processor, cause the processor to implement the method according to claim 1.

10. A terminal, comprising a processor, a memory, and instructions stored in the memory and capable of running on the processor, wherein instructions, when executed by the processor, implement:

in a case of monitoring for a wake-up signal in a low-power state, detecting a beacon signal based on pre-configured configuration information; and switching to a normal idle state in a case that a detection result is at least one of the following:

the terminal has detected no beacon signal; or signal quality of the beacon signal detected by the terminal is lower than a preset threshold;

wherein the instructions, when executed by the processor, further implement following step before the detecting the beacon signal based on pre-configured configuration information:

in the normal idle state or a connected state, obtaining the configuration information;

wherein the configuration information comprises at least one of the following: frequency of the beacon signal, subcarrier of the beacon signal, slot of the beacon signal, sequence of the beacon signal, period of the beacon signal, or power of the beacon signal.

11. The terminal according to claim 10, wherein the instructions, when executed by the processor, further implement:

in response to receiving the wake-up signal in the low-power state, waking up the terminal to enter the normal idle state to monitor at least one of synchronization information, paging information, or system information broadcast (SIB).

12. The terminal according to claim 10, wherein the normal idle state is radio resource control (RRC) idle state; and compared with the RRC idle state, a signal detection by a radio frequency (RF) module and a signal processing by a modem are not performed in the low-power state.

13. The terminal according to claim 10, wherein after the switching to the normal idle state, the terminal performs at least one of the following operations:

cell search;

downlink synchronization;

cell selection;

receiving system information in a camped cell selected;

receiving paging information in a camped cell selected; or initiating a random access procedure in a camped cell selected.

14. The terminal according to claim 10, wherein the instructions, when executed by the processor, further implement:

continuing to stay in the low-power state to monitor for the wake-up signal in a case that the detection result satisfies the following condition:

the terminal has detected a beacon signal with signal quality greater than or equal to the preset threshold.

15. The terminal according to claim 10, wherein the detecting the beacon signal based on pre-configured configuration information comprises:

during movement within a target paging area, detecting, based on the configuration information, the beacon signals respectively sent by a plurality of cells.

16. A state switching method, comprising:

obtaining, by a terminal in a normal idle state or a connected state from a network side device, a configuration information; wherein the configuration information comprises at least one of the following: frequency of a beacon signal, subcarrier of the beacon signal, slot of the beacon signal, sequence of the beacon signal, period of the beacon signal, or power of the beacon signal;

switching, by the terminal, from the normal idle state or the connected state to a low-power state for monitoring a wake-up signal sent by the network side device without monitoring synchronization information, paging information, and/or system information broadcast (SIB) sent by the network side device;

when monitoring for the wake-up signal in the low-power state, detecting, by the terminal, the beacon signal sent by the network side device based on the configuration information; and switching, by the terminal, from the low-power state to the normal idle state in a case that a detection result is at least one of the following:

the terminal has detected no beacon signal; or signal quality of the beacon signal detected by the terminal is lower than a preset threshold.

* * * * *